United States Patent
Ko

(10) Patent No.: US 9,788,173 B2
(45) Date of Patent: Oct. 10, 2017

(54) INCOMING AND OUTGOING TERMINAL SERVICE CONTROL SYSTEM AND METHOD THEREOF

(71) Applicant: Ilkwon Ko, Seoul (KR)

(72) Inventor: Ilkwon Ko, Seoul (KR)

(73) Assignee: SMARTSHOP CO., LTD. (KR)

( * ) Notice: Subject to any disclaimer, the term of this patent is extended or adjusted under 35 U.S.C. 154(b) by 0 days.

(21) Appl. No.: 14/287,875

(22) Filed: May 27, 2014

(65) Prior Publication Data

US 2014/0357239 A1  Dec. 4, 2014

(30) Foreign Application Priority Data

May 28, 2013 (KR) .......................... 10-2013-0060432

(51) Int. Cl.
*H04M 3/42* (2006.01)
*H04W 4/12* (2009.01)
(Continued)

(52) U.S. Cl.
CPC .............. *H04W 4/12* (2013.01); *H04L 67/26* (2013.01); *H04M 1/57* (2013.01); *H04M 1/663* (2013.01);
(Continued)

(58) Field of Classification Search
None
See application file for complete search history.

(56) References Cited

U.S. PATENT DOCUMENTS 6,016,341 A * 1/2000 Lim ................ H04M 1/274516
379/142.01
2004/0266407 A1* 12/2004 Lee ....................... H04W 88/02
455/414.1
(Continued)

FOREIGN PATENT DOCUMENTS

JP  20004-312559  11/2004
JP  2007-235901   9/2007
(Continued)

OTHER PUBLICATIONS

Search Report issued by PCT Office on Aug. 27, 2014 in connection with corresponding PCT application No. PCT/KR2014/004674.

*Primary Examiner* — Keith Fang
(74) *Attorney, Agent, or Firm* — Ostrolenk Faber LLP

(57) ABSTRACT

The present disclosure relates to an incoming and outgoing terminal service control system and a method thereof, and more particularly, a plurality of connection services may be provided according to the phone number and the type of character contained in an outgoing number to freely set up or change the connection target of the calling party according to the called party's intention, thereby having the effect of providing various connection services according to the called party's intention or current status, and an outgoing number containing at least one or more characters may be converted to a preset incoming number to attempt a call through an ARS server so as to connect to the called party's shop or home page in connection with the ARS server through a voice communication channel, thereby having the effect of checking the use of a specific service due to enhanced reliability during the conversion connection compared to the connection through a data channel, and a call connection may be rejected and then a connection service may be provided using the rejection information while connecting to an ARS server through a voice communication (Continued)

channel not to impose a service charge according to the voice call connection, thereby having the effect of enhancing the reliability of connection without imposing a cost burden due to the enhanced reliability.

5 Claims, 9 Drawing Sheets

(51) Int. Cl.
  *H04M 1/725* (2006.01)
  *H04M 1/57* (2006.01)
  *H04M 1/663* (2006.01)
  *H04L 29/08* (2006.01)
  *H04W 4/16* (2009.01)

(52) U.S. Cl.
  CPC ... *H04M 1/72561* (2013.01); *H04M 1/72569* (2013.01); *H04M 1/72577* (2013.01); *H04W 4/16* (2013.01)

(56) References Cited

U.S. PATENT DOCUMENTS

| | | | |
|---|---|---|---|
| 2008/0174568 A1* | 7/2008 | Kim | G06F 3/04886 345/173 |
| 2009/0131114 A1* | 5/2009 | Mukai | H04M 1/72561 455/564 |
| 2010/0210245 A1* | 8/2010 | Kim | H04M 3/42382 455/412.1 |
| 2012/0077467 A1* | 3/2012 | Fan | H04W 4/14 455/414.1 |

FOREIGN PATENT DOCUMENTS

| | | |
|---|---|---|
| KR | 10-2003-0066870 | 9/2003 |
| KR | 10-2005-0079131 | 8/2005 |

* cited by examiner

INCOMING AND OUTGOING TERMINAL SERVICE CONTROL SYSTEM AND METHOD THEREOF

RELATED APPLICATION

Pursuant to 35 U.S.C. §119(a), this application claims the benefit of earlier filing date and right of priority to Korean Application No. 10-2013-0060432 on May 28, 2013, the contents of which is incorporated by reference herein in its entirety.

BACKGROUND OF THE INVENTION

1. Field of the Invention

The present disclosure relates to an incoming and outgoing terminal service control system and a method thereof, and more particularly, to an incoming and outgoing terminal service control system for providing various connection services to a calling party through a user interface of voice call communication, and a control method thereof.

2. Description of the Related Art

In recent years, with the rapid spread of smart phones, the development of applications providing various services using a data communication means and a variety of sensors configured in the relevant smart phone has been conspicuously carried out, and the existing mobile communication terminal paradigm that has been recognized as an existing voice call communication has been changed to a smart paradigm embracing navigation devices, multimedia players, networking, and the like.

A lot of applications providing various services have been provided using various means configured in a smart phone, but voice call functions in a mobile communication terminal maintain their unique independent functions.

In other words, even though currently provided applications support voice communication, they are limited to the extent of providing a link for activating voice communication functions as seen in a mobile messenger such as KakaoTalk or MyPeople, and separately operated from various functions contained in the voice communication and thus do not support a direction link function to voice communication.

In short, current applications are executed according to a user's selection in addition to voice communication functions, thus ensuring independent voice communication functions as well as supporting applications in a multi-tasking mode.

As described above, only voice communication functions maintain the existing paradigm in mobile communication terminals that have been changed to a smart paradigm in recent years.

Accordingly, drawbacks in mobile communication terminals concentrated on the existing voice call functions remain untouched, and for the description thereof, when the calling side makes a voice call to the called side but the called side does not inevitably or intentionally accept the voice call from the calling side, a voice mail may be left through a voice mailing service (VMS) according to the calling party's selection or an automated response voice message of the calling side may be listened to so as to check the status of the called side, thereby blocking a voice call connection.

In this case, the right of choice of a voice call connection is entirely granted to the calling side, and when the called party is in difficulty to answer the calling party's voice call connection, the granted right of choice will be limited to rejection of reception or waiting for a predetermined period of time until the calling party is connected to a voice mailing service (VMS).

In other words, the called side is unable to provide any active right of choice to the calling side to intentionally take various actions by providing his or her own information to the calling side who makes a voice call.

In order to solve the foregoing problem, in recent years, mobile communication service providers have introduced a method of setting up an automatic answering function even in an SMS server such that the called party transmits an automated response message set to the SMS server to the called side after the called party's rejection of reception or a predetermined standby time has passed. Through an SMS automated response message using such an SMS server, the called party may provide his or her own current status or social networking service (SNS) address, thereby allowing the calling party to acquire the called party's information.

However, in this case, the called party's right of choice is also limited to rejection of reception or having a predetermined standby time to a voice call placed by the calling party, and the SMS server unconditionally sends an automated response message to the calling side at which a voice call connection failure has occurred, and thus there is no way at the called side to restrict it when he or she does not want the provision of an automated response message through the SMS server.

In other words, a mobile communication service in the related art has a configuration in which the called side is unable to provide an SNS address contained in the SMS or his or her own information to only the calling party according to the calling party's section, and thus the called party's right of choice is still limited. Furthermore, the called party's desired information is provided only when the calling side clicks a web address linked to the automated response message transmitted in the SMS mode, and as a result, it is difficult to expect the calling party's aggressive contact according to the called party's intention.

Accordingly, the development of a system is required to diversify the called party's limited right of choice in a voice call connection as well as guide the calling side's behavior in the called party's desired direction.

Moreover, the development of a system is required to enhance connection reliability to the relevant service when various services are provided according to the called party's selection, thereby promoting the activation of the service as well as enhancing the user's convenience without cost burden due to an increase of reliability.

SUMMARY OF THE INVENTION

An object of the present embodiment for solving the foregoing problem is to provide an incoming and outgoing terminal service control system for providing a plurality of connection services according to the phone number and the type of character contained in an outgoing number, thereby freely setting up or changing the connection target of the calling party according to the called party's intention.

Another object of the present embodiment for solving the foregoing problem is to provide an incoming and outgoing terminal service control system for converting an outgoing number containing at least one or more characters to a preset incoming number to attempt a call through an ARS server, thereby connecting to the called party's shop or home page in connection with the ARS server through a voice communication channel.

Still another object of the present embodiment for solving the foregoing problem is to provide an incoming and outgoing terminal service control system for rejecting a call connection and then providing a connection service using the rejection information while connecting to an ARS server through a voice communication channel, thereby not imposing a service charge according to the voice call connection.

In order to accomplish the foregoing object, a method of providing a data communication service associated with the present disclosure may include determining whether or not an incoming number contained in a call connection request corresponds to a preset number when the call connection request is received from a first terminal, rejecting a call connection of the first terminal when the incoming number corresponds to the preset number, communicating with a second terminal using the incoming number to generate service link information, and transmitting a message containing the service link information to the first terminal to connect the first terminal to the data communication service.

Said communication step may include detecting incoming information and outgoing information using the incoming number, and generating a first message containing the outgoing information, transmitting the first message to a second terminal corresponding to the incoming information, and receiving setup information from the second terminal.

A second message containing the service link information may be generated and transmitted to the first terminal using the setup information.

When the power of the second terminal is turned off and thus the transmission of the first message is failed, the second message may be generated and transmitted to the first terminal based on preset web connection information to correspond to the second terminal.

Control applications may be provided in the first and the second terminal, respectively, and the first and the second message may be formed to execute the control applications.

When any character is detected within a phone number entered from the first terminal, the incoming number may be a number converted from the phone number.

The service link information may be generated by setup information transmitted from the second terminal, and the setup information may be differently set according to the type of character contained in the phone number, and the service link information may be information accessing a different service according to the setup information.

An ARS server may receive the incoming number from the first terminal, and reject a call connection of the first terminal, and a service server may communicate with the second terminal using incoming information based on the incoming number.

The ARS server may transmit outgoing information to the service server along with the incoming information using the incoming number, and the service server may transmit a first message containing the outgoing information to the second terminal, and receive setup information required for the service link from the second terminal.

Furthermore, according to the present disclosure, there is disclosed a server device for providing a data link service including a first server configured to analyze call connection request information upon receiving a call connection request so as to reject a call connection according to the call connection request, and transmit incoming information and outgoing information using the call connection request information when an outgoing terminal number corresponds to a preset predetermined terminal number, and a second server configured to generate a message containing outgoing information received from the first server, and transmit the outgoing information to a second terminal using the incoming information, and generate and transmit data service link information according to setup information to the first terminal upon receiving the setup information from the second terminal.

The first server may receive an incoming number from the first terminal, and obtain the incoming information and outgoing information and then transmit the incoming information and outgoing information to the second server.

The second server may transmit a first message containing the outgoing information to the second terminal corresponding to the incoming information, and receive the setup information detected based on the first message from the second terminal.

The second server may transmit a second message containing the service link information to the first terminal to connect the first terminal to a service based on the second message.

When the power of the second terminal is turned off and thus the transmission of the first message is failed, the second message may be generated and transmitted to the first terminal based on preset web connection information to correspond to the second terminal.

Furthermore, according to the present disclosure, there is provided a method of providing a data link service from a terminal, including determining whether or not one or more characters are contained in an input value for call connection entered to the terminal, converting the input value to another incoming number according to a preset conversion criteria to transmit a call request when one or more characters are contained therein, and providing a data link service based on a message received in response to the call request.

A data link service associated with service link information other than a call connection may be connected using the service link information received from a server.

Any one of a shop connection, a bulletin board connection, a blog connection, and an absence notification service connection may be carried out based on the service link information.

When there is the call request from another terminal, setup information for generating the service link information may be detected to transmit the setup information to the server.

Furthermore, according to the present disclosure, there is provided a terminal device including a controller, an input unit and a wireless communication unit, wherein the controller, input unit and wireless communication unit perform the steps including determining whether or not one or more characters are contained in an input value for call connection entered to the input unit, converting the input value to another incoming number according to a preset conversion criteria to transmit a call request through the wireless communication unit when one ore more characters are contained therein, and providing a data link service based on a message received in response to the call request.

The controller may connect a data link service associated with service link information other than a call connection using the service link information received from a server.

According to an incoming and outgoing terminal service control system and a method thereof associated with an embodiment of the present disclosure, a plurality of connection services may be provided according to the phone number and the type of character contained in an outgoing number to freely set up or change the connection target of the calling party according to the called party's intention, thereby having the effect of providing various connection services according to the called party's intention or current status.

According to an incoming and outgoing terminal service control system and a method thereof associated with an embodiment of the present disclosure, an outgoing number containing at least one or more characters may be converted to a preset incoming number to attempt a call through an ARS server so as to connect to the called party's shop or home page in connection with the ARS server through a voice communication channel, thereby having the effect of checking the use of a specific service due to enhanced reliability during the conversion connection compared to the connection through a data channel.

According to an incoming and outgoing terminal service control system and a method thereof associated with an embodiment of the present disclosure, a call connection may be rejected and then a connection service may be provided using the rejection information while connecting to an ARS server through a voice communication channel not to impose a service charge according to the voice call connection, thereby having the effect of enhancing the reliability of connection without imposing a cost burden due to the enhanced reliability.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The present disclosure as described above will be described in detail through the accompanying drawings and embodiments.

Figure 1:
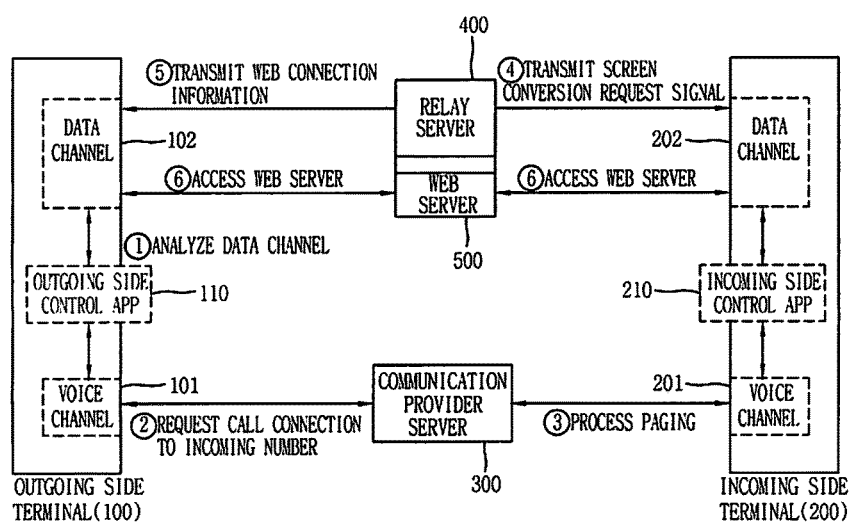
FIG. 1 is a view illustrating the screen conversion control configuration of an incoming terminal in an incoming and outgoing terminal service control system according to an embodiment of the present disclosure.

FIG. 1 is a view illustrating the screen conversion control configuration of an incoming terminal in an incoming and outgoing terminal service control system according to an embodiment of the present disclosure.

Referring to FIG. 1, as illustrated in the drawing, an incoming and outgoing terminal service control system may include an outgoing control application 110 installed in a first terminal 100, an incoming control application 210 installed in a second terminal 200, a relay server 400, a web server 500, and an exchanger 300.

Here, the outgoing control application and incoming control application 110, 210 are configured to link with a voice channel 101 and a data channel 102 in the first terminal 100.

Accordingly, when a calling party originates a call to an incoming number corresponding to the second terminal 200 through the first terminal 100, the outgoing control application 110 is activated (2). In this case, the first terminal 100 may be an outgoing terminal, and the second terminal 200 may be an incoming terminal. However, the present disclosure may not be necessarily limited to this, and the first terminal and second terminal may be an incoming terminal and an outgoing terminal, respectively. For another example, the first terminal may be a mobile terminal, and the second terminal may be a stationary terminal such as a server.

Furthermore, the outgoing control application 110 may set up a relay server and a data channel 102 in advance according to the communication quality and setting, but the data channel may not be set up when the quality of the data channel 102 is less than a preset reference value (1).

On the other hand, the exchanger 300 allows the second terminal 200 to be paired according to a call connection request signal of the first terminal 100 (3), and the incoming control application 210 is activated when the second terminal 200 receives a call connection signal according to paging.

Figure 2:
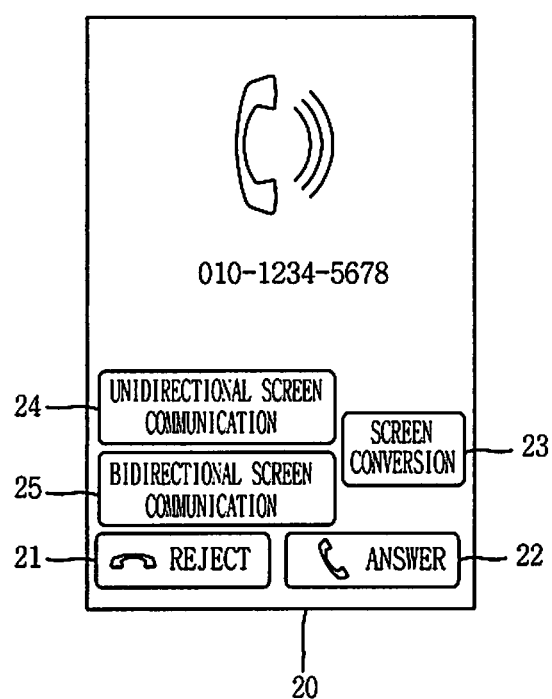
FIG. 2 is a view illustrating an incoming screen provided by an incoming control application according to an embodiment of the present disclosure.

Here, the incoming control application 210 may provide a screen conversion select button or partial screen popup 23 for connecting the first terminal 100 to a web page set by the user of the second terminal 200 along with a response button or reject button 21, 22 for an outgoing call contained in the existing incoming screen 20 may be provided to the incoming screen 20 as illustrated in FIG. 2.

Accordingly, when the user selects the screen conversion select button or partial screen popup 23, the incoming control application 210 blocks the call connection signal, and transmits a screen conversion request signal containing the calling party's number corresponding to the outgoing terminal 100 through a data channel of the second terminal 200 to the relay server 400 (4).

Here, the relay server 400 may include web connection information set by the user of the incoming terminal, and the web connection information may include address information on the user's web page stored in the web server 500, and the web page may include an social networking service (SNS), blog or the like including a mini homepage, Facebook, Twitter, and the like.

The relay server 400 that has received the screen conversion request signal may transmit the web connection information to the outgoing control application 110 using a transmission mode such as a push message, SMS, MMS, and the like to connect a data channel between the web server 500 and the outgoing control application 110 according to the web connection information.

Here, the push message may be transmitted through a push server such as cloud to device messaging (C2DM), Apple Push Notification service (APNS) and the like (5).

Accordingly, the outgoing control application 110 may connect an additional data channel 102 to the web server 500 according to the reception of the web connection information so as to access the web server 500 linked by the web connection information, and convert an outgoing screen loaded during a call origination to a web page corresponding to the web connection information (6).

Here, the outgoing control application 110 may block the voice channel 101 according to a call origination while receiving the web connection information, and the incoming control application 210 may selectively transmit a signal for the blocking of the voice channel 101 to selectively determine the blocking of the voice channel 101 of the outgoing terminal 100.

In this manner, when the user of the second terminal 200 is in difficulty to answer the arrived calling party's call, the screen of the first terminal 100 may be converted to a web page including the user's personal information to induce him or her to leave a message on the relevant web page, and the existing calling party based call mode may be converted to a called party based call mode without the called party being required to wait until the calling party stops originating a call.

Furthermore, the calling party is not also required to wait until the called party receives a call, and is able to assume the called party's intention or current status when the screen is converted to a web page, thereby taking the called party's convenience as well as the calling party's convenience into consideration.

In addition, the calling party may acquire the called party's personal information through a web page, and leave a message on the web page loaded through screen conversion, thereby reducing a burden of disconnecting a call and leaving a message using SMS or MMS.

Figure 3:
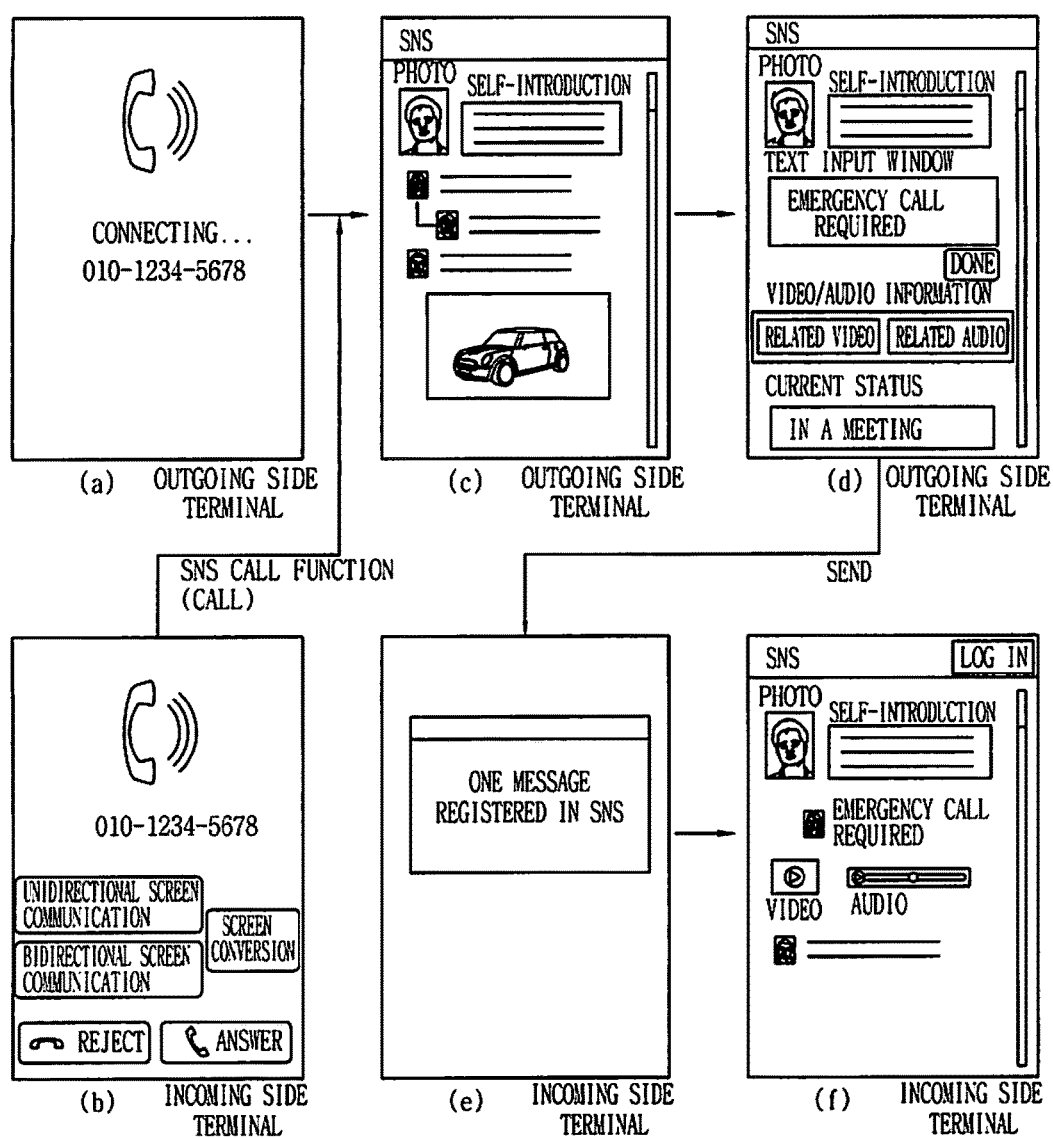
FIG. 3 is a view illustrating a screen displayed on an outgoing terminal and an incoming terminal during a screen conversion control process according to an embodiment of the present disclosure.

FIG. 3 is a schematic view illustrating a screen displayed on the incoming terminal 200 and outgoing terminal 100 according to the process in FIG. 1, and describing FIG. 3 with reference to the content of FIG. 1, first, as illustrated in FIG. 3A, when a call is originated from the outgoing terminal 100 to the called party's number of the incoming terminal 200, the outgoing control application 110 is activated.

Then, as illustrated in FIG. 3B, when the when the calling party's number of the incoming terminal 200 is arrived, the incoming control application 210 may transmit a screen conversion request signal to the relay server 400 upon receiving a screen conversion select button or partial screen popup through the user's selection, thereby transmitting web connection information to the outgoing control application 110.

Next, as illustrated in FIG. 3C, the outgoing control application 110 that has received the web connection information may access the web server 500 according to the web connection information to convert the outgoing screen of the outgoing terminal to the called party's web page.

Here, as illustrated in FIG. 3D, the calling party may enter message information on a web page loaded through screen conversion, and the message information may include multimedia information including video information and voice information as well as text.

On the other hand, as illustrated in FIG. 3E, the web server 500 that has received message information from the outgoing terminal may transmit notification information on the registered message information to the incoming terminal 200 matching the web page. Accordingly, as illustrated in FIG. 3F, the incoming terminal 200 may access the web server 500 according to the user's selection to check message information registered by the calling party, and leave a comment on the message information.

At this time, the notification information may be transmitted to the incoming terminal 200 in a push message, SMS, or MMS transmission mode.

Furthermore, the web server 500 and relay server 400 may be configured with one server. Accordingly, the incoming control application 210 may transmit identification information such as an ID or personal code used in the web server 500 instead of the called party's number, and the outgoing control application 110 may receive the identification information as the web connection information from the relay server 400 to immediately connect a web page stored in the web server 500 in connection with the relay server 400 through the identification information to a preset data channel 102.

On the other hand, the incoming control application 210 and outgoing control application 110 that have been described in FIGS. 1 through 3 may be the same application, and when the incoming terminal 200 places a call to the outgoing terminal 100, the outgoing control application 110 is operated as the incoming control application 210, and the incoming control application 210 may be also operated as the outgoing control application 110. The incoming control application 210 and outgoing control application 110 which will be described below may be also the same application.

Furthermore, the outgoing control application and incoming control application 110, 210 may be configured with a mobile web browser function for loading the web page or configured to link to a mobile web browser previously installed in the outgoing terminal and incoming terminal.

Figure 4:
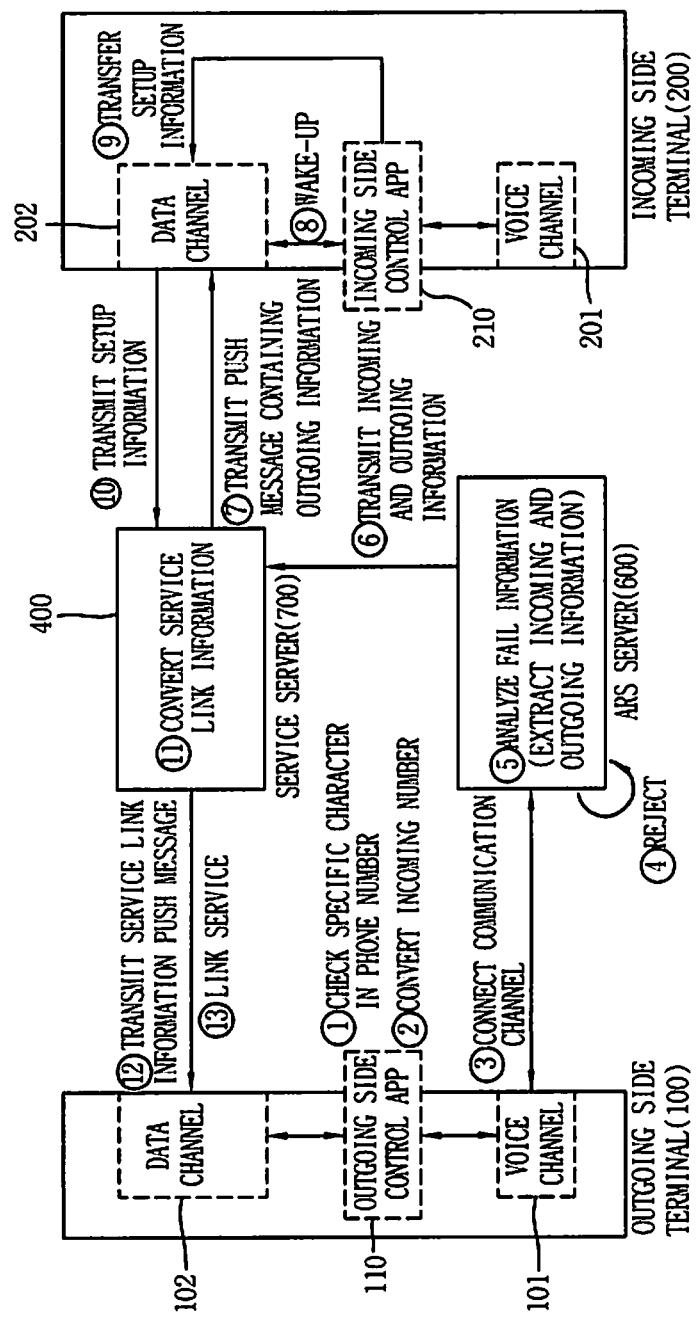
FIG. 4 is a view illustrating a service control method of an incoming and outgoing terminal service control system according to another embodiment of the present disclosure.

FIG. 4 is a view illustrating a service control method of an incoming and outgoing terminal service control system according to another embodiment of the present disclosure.

Referring to FIG. 4, an incoming and outgoing terminal service control system according to another embodiment of the present disclosure may include an outgoing terminal 100 including an outgoing control application 110, a first server 600, a second server 700 and an incoming terminal 200 including an incoming control application 210.

A service control method of an incoming and outgoing terminal service control system according to another embodiment of the present disclosure will be described below according to the sequence.

First, the outgoing control application 110 of the outgoing terminal 100 detects one or more characters contained in a phone number originated by the calling party (1).

Here, the outgoing phone number as a combination including numerals and characters, and the character contained in the outgoing phone number may be a specific character such as "#" or "*" as a preferred embodiment.

Then, the outgoing control application 110 of the outgoing terminal 100 converts the phone number (including the above character) to an incoming number according to a preset conversion criteria (2) to attempt a call through the voice channel 101 (3).

According to a preferred embodiment, if the calling party presses an outgoing phone number including a typical number consisting of numerals, a specific character such as "#" or "*" or a typical character such as "b", "s" and the like and then presses a call button, then the outgoing control application 110 may detect typical characters, specific characters, complex characters (combined with typical characters and specific characters), or the like from the outgoing phone number to automatically originate to a specific ARS number (the incoming number) corresponding to the outgoing phone number.

The ARS number corresponding to the outgoing phone number may be previously stored in the outgoing control application 110 or obtained through a preset transformation rule or received through a link to the service server 700.

Furthermore, the incoming number may include URL information for accessing data communication. For example, the controller of the outgoing control application 110 or outgoing terminal determines whether or not one or more characters are contained in an input value for call connection entered to the terminal, and converts the input value to another URL information according to a preset conversion criteria to transmit a call request (or data communication request) when one or more characters are contained therein. For another example, the incoming number may include access information for accessing a data communication network such as Wi-Fi.

Then, the outgoing terminal provides a data link service based on a message received in response to the call request (or data communication request). Hereinafter, the subsequent steps will be described in more detail.

According to the incoming number, the first server 600 responding to a call of the outgoing terminal 100 rejects a call connection to the outgoing terminal 100 (4).

The first server 600 may be an ARS server, for example, but the present disclosure may not be necessarily limited to this, and the first server 600 may be another form of server.

At this time, the SRS server 600 analyzes the reject information of the call based on the incoming number to obtain incoming information (incoming terminal information corresponding to the incoming number) and outgoing information (outgoing terminal information) (5), and transmits the incoming information and outgoing information to second server 700 (6).

The second server 700 may be a service server, for example, but the present disclosure may not be necessarily limited to this, and the second server 700 may be another form of server.

According to a preferred embodiment, the ARS server 600 processes the received call connection to be failed (forcibly blocked) not to impose a call charge for the call of the outgoing terminal 100.

According to an incoming and outgoing terminal service control system associated with an embodiment of the present disclosure, a call connection may be rejected and then a connection service may be provided using the rejection information while connecting to an ARS server 600 through a voice communication channel not to impose a service charge according to the voice call connection, thereby having an advantage of enhancing the reliability of connection without imposing a cost burden due to the enhanced reliability.

Furthermore, the first server 600 may further include connecting a call of the outgoing terminal 100 with no rejection based on the incoming number to provide an ARS service.

The service server 700 that has received the incoming information and outgoing information transmits a first message including the outgoing information to the incoming terminal 200 corresponding to the incoming information (7).

According to a preferred embodiment, the service server 700 may transmit a wakeup PUSH message including the outgoing terminal information to the incoming terminal 200 through a data channel 102 (8).

The incoming terminal 200 that has received first message generates setup information required for the service link of the outgoing control application 110 based on the first message through the incoming control application 210 (9) to transmit the setup information to the service server 700 (10).

According to a preferred embodiment, the incoming terminal 200 may transmit setup information for controlling the outgoing control application 110 of the outgoing terminal 100 to the service server 700 through the woken-up incoming control application 210, and at this time, generate setup information using mapping DB information within the incoming control application 210 or generate and transmit setup information in the form of previously promised with the service server 700.

The service server 700 converts the received setup information to service link information to generate a second message (11) and then transmit the second message to the outgoing terminal 100 (12).

According to a preferred embodiment, based on differently set setup information according to the type of one or more characters contained in the outgoing phone number, the service server 700 may generate service link information accessing a different service according to the setup information.

Furthermore, the service server 700 may preferably transmit the first and the second message using a transmission mode such as a push message, SMS, MMS, and the like.

Moreover, as described above, the incoming control application 210 may be executed through the first message, and the outgoing control application 110 may be also executed through the second message. For example, it may be configured such that the incoming control application 210 is woken up through the first message, and the outgoing control application 110 is also woken up through the second message.

According to a more preferred embodiment, it may be configured such that when the power of the incoming terminal 200 is turned off and the transmission of the first message is failed, the service server 700 generates and transmits the second message to the outgoing terminal 100 based on preset web connection information to correspond to the incoming terminal 200.

In this case, the functions of the ARS server and service server may be integrated into a data server for their operations. In other words, when a call connection request is received from the first terminal to provide a data communication service, the data server determines whether or not an incoming number contained in the call connection request corresponds to a preset number, and rejects the call connection of the first terminal when the incoming number corresponds to the preset number. Furthermore, it may be formed such that the data server may communicate with the second terminal using the incoming number to generate service link information, and transmit a message containing the service link information to connect the first terminal to the data communication service.

For another example, when URL information or access information for accessing a data communication network is contained in the incoming number, the data server may omit the process of rejecting a call connection of the first terminal. At this time, a signal for call connection may not be transmitted from the terminal.

On the other hand, the outgoing terminal 100 that has received the second message is connected to a service based on the second message through the outgoing control application 110 (13).

As described above, the outgoing terminal 100 detects a character contained in a phone number for call connection, and generates and transmits an incoming number using the phone number when the character is detected, and connects to a preset service using the received service link information. In this case, the incoming terminal 200 generates and transmits setup information using the received outgoing information. Furthermore, the server detects the outgoing information to the incoming terminal using the incoming number, and generates and transmits the service link information to the outgoing terminal 100 based on the setup information received from the incoming terminal 200.

According to a preferred embodiment, it may be configured such that the outgoing control application 110 allows the screen of the outgoing terminal 100 to access a mobile web page based on the second message containing service link information or drives a specific application through an internal interface of the outgoing terminal 100 so as to provide the called party's desired various services.

As described above, the outgoing control application 110 and the incoming control application 210 may be the same application.

When the outgoing terminal 100 tries to connect to the incoming terminal 200 through the data channel 102, situations frequently occur in which the reliability of a connection cannot be guaranteed due to various problems while linking between the outgoing terminal 100 and incoming terminal 200, whereas according to an incoming and outgoing terminal service control system according to an embodiment of the present disclosure, an outgoing number containing at least one or more characters is converted to a preset incoming number to attempt a call through the ARS server 600 so as to provide a service for connecting to the called party's shop or home page in connection with the ARS server 600 through the voice communication channel 101, thereby checking the use of a specific service due to enhanced reliability during the conversion connection compared to the connection through the data channel 102.

Figure 5:
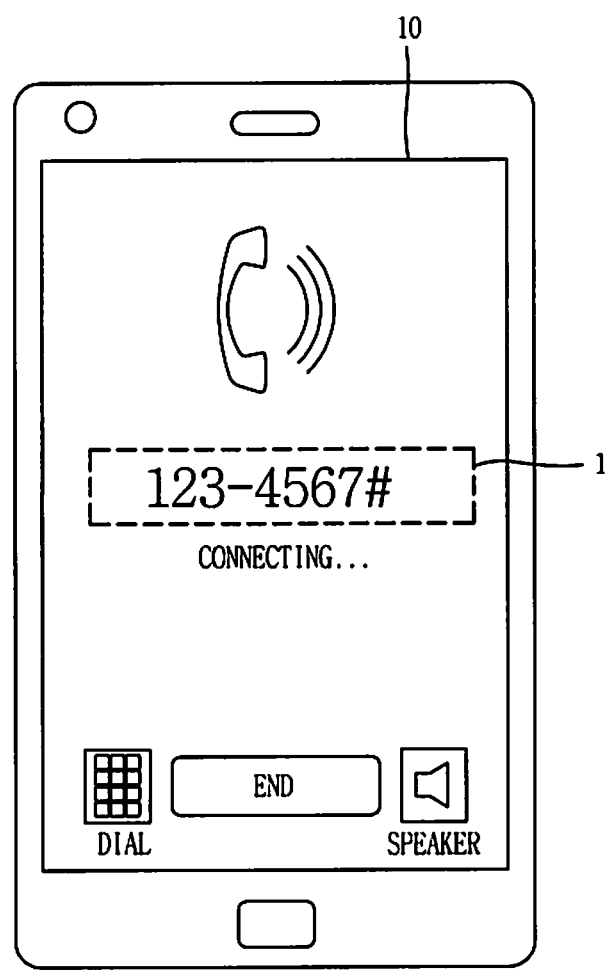
FIG. 5 is an example illustrating the outgoing screen of an outgoing terminal according to another embodiment of the present disclosure.

FIG. 5 illustrates a screen on which the calling party selects an outgoing phone number containing a character (1) to attempt a call, as an example of the outgoing screen 10 of the outgoing terminal 100 according to another embodiment of the present disclosure.

Referring to FIG. 5, the outgoing control application 110 of the outgoing terminal 100 may convert a phone number including at least one of typical characters, specific characters and complex characters to an incoming number according to a preset conversion criteria.

According to a more specific embodiment, as illustrated in the drawing, the outgoing control application 110 of the outgoing terminal 100 may convert a phone number including at least one of "#" and "*" to the incoming number, and according to another embodiment, various typical characters and complex characters may be mixed with numerals to be used as the outgoing phone number.

Figure 6:
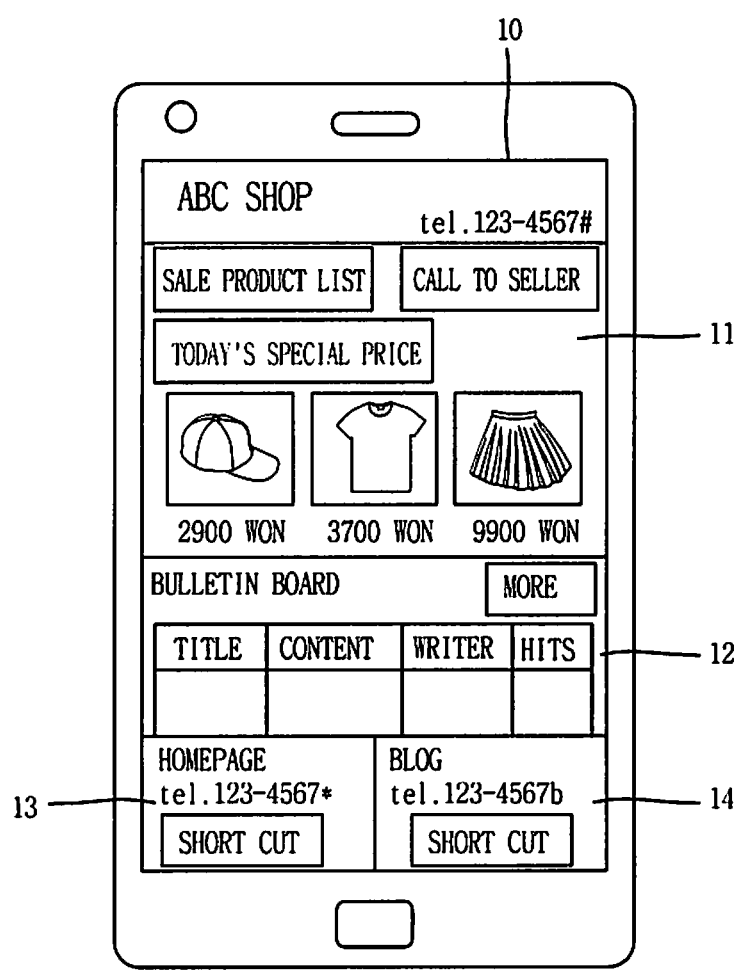
FIGS. 6 and 7 are examples illustrating the service link screen of an outgoing terminal according to another embodiment of the present disclosure.
Figure 7:
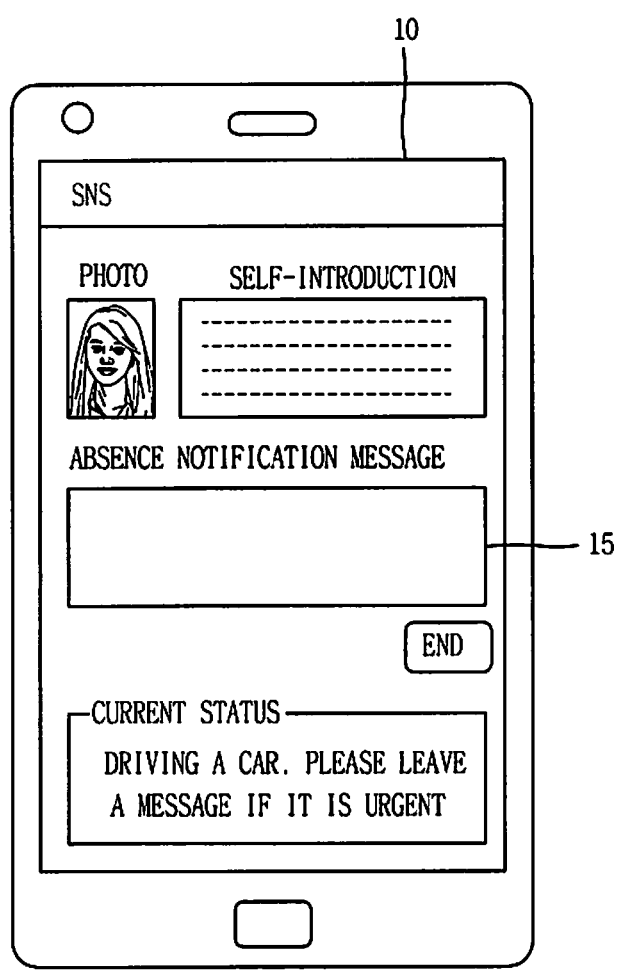

FIGS. 6 and 7 illustrate a screen to which the outgoing terminal 100 that has received the second message from the service server 700 is linked based on the second message, as an example of the service link screen 10 of the outgoing terminal 100 according to another embodiment of the present disclosure.

Referring to FIGS. 6 and 7, the outgoing terminal 100 according to another embodiment of the present disclosure may receive a service screen 10 linked in response to a phone number originated from the calling party based on the second message, and the outgoing control application 110 may convert the screen 10 of the outgoing terminal 100 to the called party's sale product shop or the called party's social networking service (SNS) through the second message as illustrated in FIGS. 6 and 7.

Preferably, it may be configured such that the outgoing control application 110 of the outgoing terminal 100 is directly connected to any one of a shop connection 11, a bulletin board connection 12, a home page connection 13, a blog connection 14, and an absence notification service connection.

Otherwise, it may be configured such that the outgoing control application 110 of the outgoing terminal 100 sets up the data channel 102 for communication with the service server 700 in advance at the time of origination according to the communication quality or setting to expedite the reception of the second message.

Referring to FIG. 6, the outgoing terminal 100 that has attempted a call to "123-4567#", for example, can be move to the called party's shop page 10 that is operated online according to the called party's setting through the operation of the outgoing control application 110.

According to another preferred embodiment, the outgoing terminal 100 according to another embodiment of the present disclosure can be directly moved to each screen based on the second message including link information directly connecting to the called party's sale product list screen 11, or bulletin board 12, home page 13, blog 14, and the like according to the called party's setting.

For example, as illustrated in FIG. 7, it may be configured to be moved to the called party's SNS screen 10 according to an outgoing phone number (for example, when the calling party originates a call to "123-4567#"), thereby allowing the calling party to quickly recognize the called party's current status 10 or leave a notification message during his or her absence (15).

Furthermore, more preferably, the setting of the movement conversion may vary according to the called party's intention or setting, and for example, it may be configured to be variably set according to the calling party's location information while originating a call, outgoing time information, relation with the calling party and the like even with the same outgoing number.

In this manner, according to an incoming and outgoing terminal service control system associated with an embodiment of the present disclosure, it may be configured such that the control right of a service corresponding to the calling party's outgoing phone number is granted to the called party to set up a service corresponding to the outgoing phone number in a various or variable manner according to the call situation or the called party's intentional setting so as to provide a connection service, and the scope of providing a call service between the calling party and the called party is expanded to facilitate various additional services through a voice call connection user interface.

Figure 8:
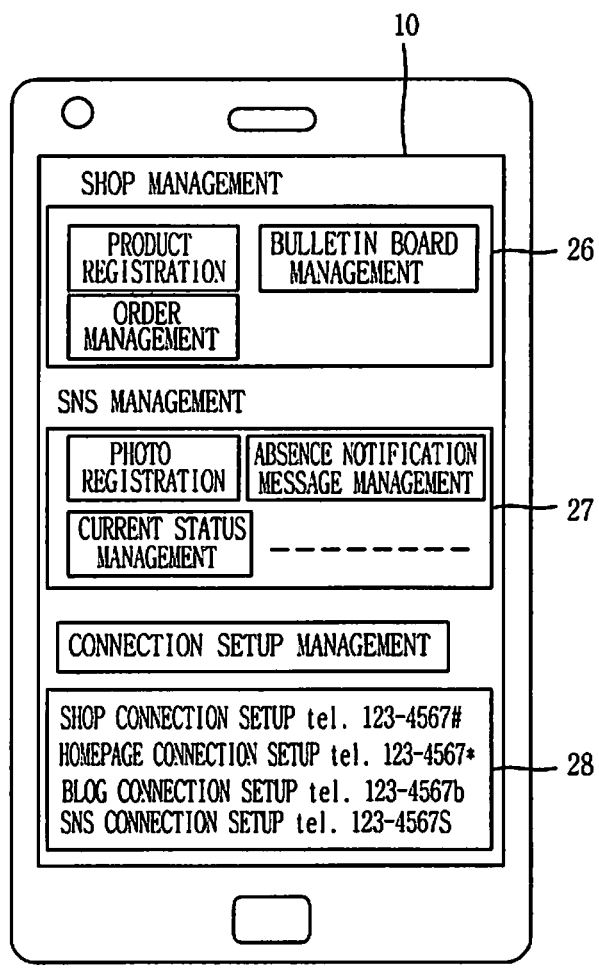
FIG. 8 is an example illustrating the service management screen of an incoming terminal according to another embodiment of the present disclosure.

FIG. 8 illustrates an example of a management screen 20 for the called party's shop management 26, SNS management 27, and connection setting management 28 corresponding to phone numbers through the incoming control application 210, as an example illustrating the service management screen 20 of the incoming terminal 200 according to another embodiment of the present disclosure.

Referring to FIG. 8, it may be configured to modify, add, delete or update a connection setting 28 corresponding to an outgoing phone number through the incoming control application 210 of the incoming terminal 200 according to another embodiment of the present disclosure.

As illustrated in the drawing, the called party may configure 28 his or her own online shop, homepage, blog, SNS, and the like to be connected to outgoing phone numbers, respectively.

According to a preferred embodiment, the incoming control application 210 of the incoming terminal 200 may generate the setup information required for a service link including at least one of a web link service and a predetermined application link based on the first message, and the incoming control application 210 extracts information corresponding to an outgoing phone number from the first message according to the connection setting management 28 managed by the called party to generate the setup information, thereby connecting to the called party's desired service.

Furthermore, the incoming control application 210 of the incoming terminal 200 may generate and transmit the setup information to the service server 700 to provide a different service link according to the received outgoing information.

As described above, the setup information may be generated to connect to an online shop, a homepage, a blog, an SNS or the like in response to each phone number, and more preferably, when an additional application is required for the outgoing control application 110 to link with the relevant service at the connection, setup information for controlling the outgoing control application 110 may be generated and transmitted to drive an operation for requesting installation or the additional application if installed.

Furthermore, a configuration for generating the foregoing setup information and a second message including service link information may be located in a selectively variable manner at the incoming control application 210 or the service server 700.

Moreover, the incoming control application 210 may be preferably configured to support the called party's online shop management, and for example, may include a function 26 for registering and managing a product or managing a bulletin board or checking an order.

Furthermore, the incoming control application 210 may further include a function for managing an absence notification message in connection with SNS illustrated in FIG. 7 or a function 27 for notifying the current status of the called party or the incoming terminal 200.

Moreover, it is noteworthy that the incoming control application 210 can manage 28 a connection setup to correspond to a phone number made of a combination of various types of numerals and characters such as "123-4#57", "#*#-3456" or the like as well as an outgoing phone number in the form of numerals +"#".

As described above, an incoming and outgoing terminal service control system according to an embodiment of the present disclosure may provide a plurality of connection services according to the phone number and the type of character contained in an outgoing number to freely set up or change the connection target of the calling party according to the called party's intention, thereby providing various connection services according to the called party's intention or current status.

On the other hand, an incoming and outgoing terminal service control system according to another embodiment of the present disclosure may convert an outgoing number containing at least one or more characters to a preset incoming number to attempt a call, and may include the outgoing terminal 100 including the outgoing control application 110 configured to connect to a preset service based on a second message received in response to the call attempt, the ARS server 600 configured to reject a call connection to the outgoing terminal 100, and transmit incoming information and outgoing information obtained based on the incoming number, the service server 700 configured to receive the incoming information and information so as to transmit a first message including the outgoing information, and transmit a second message generated based on setup information received in response to the first message to the outgoing terminal 100, and the incoming terminal 200 including the incoming control application 210 configured to generate and transmit the setup information for the service connection based on the first message received from the service server 700 to the service server 700.

Figure 9:
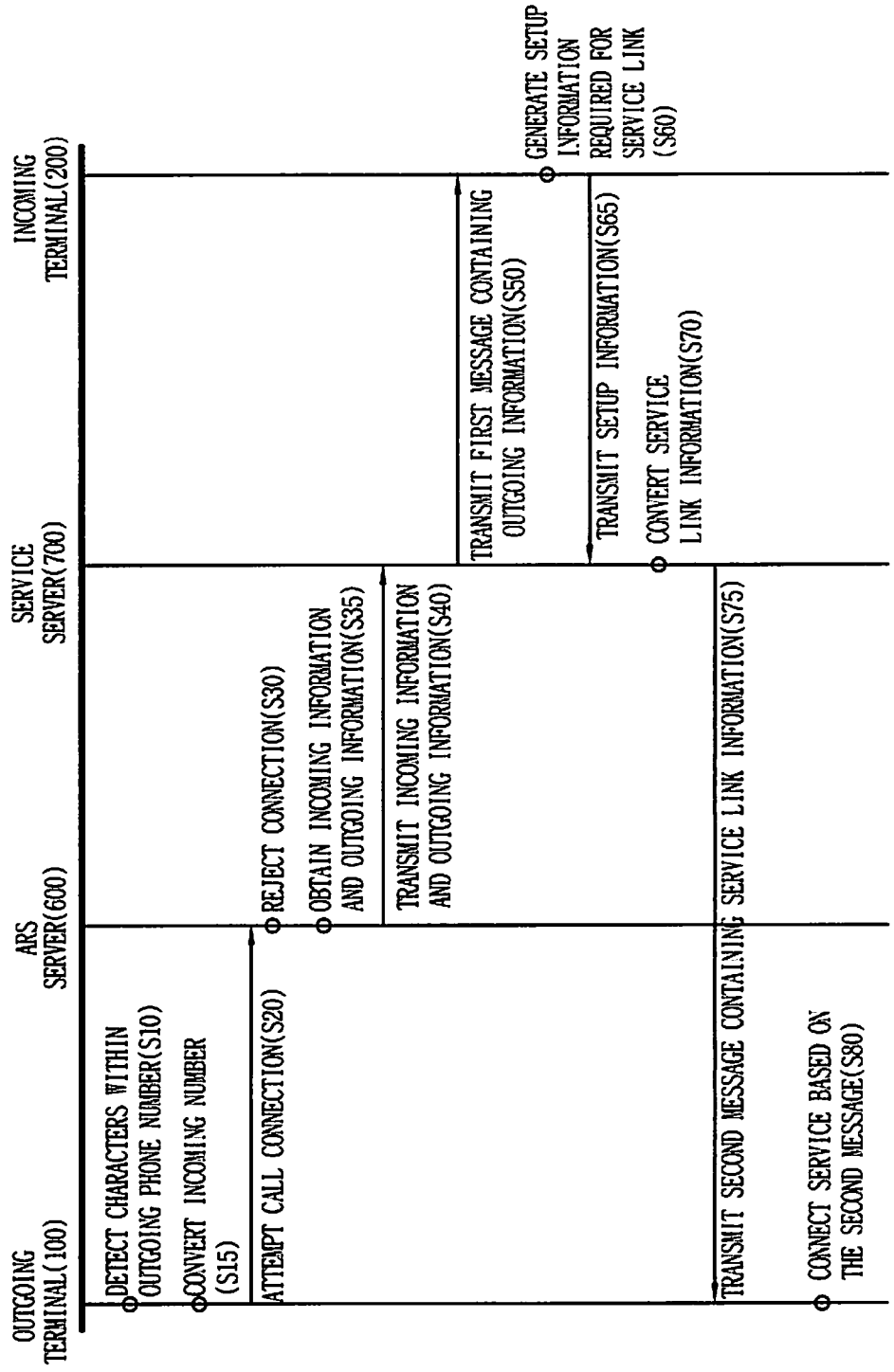
FIG. 9 is a data flow chart illustrating an incoming and outgoing terminal service control method according to another embodiment of the present disclosure.

FIG. 9 is a data flow chart illustrating an incoming and outgoing terminal service control method according to another embodiment of the present disclosure.

Referring to FIG. 9, an incoming and outgoing terminal service control method according to another embodiment of the present disclosure may include detecting one or more characters contained in a phone number originated by the calling party through the outgoing control application 110 of the outgoing terminal 100 (S10), converting the phone number to an incoming number according to a preset conversion criteria (S15) to attempt a call (S20), rejecting a call connection to the outgoing terminal 100 through the ARS server 600 responding to the call of the outgoing terminal 100 (S30), but analyzing the rejection information of the call based on the incoming number (S35) to obtain incoming information and outgoing information and then transmit the incoming information and outgoing information to the service server 700 (S40), transmitting a first message including the outgoing information to the incoming terminal 200 corresponding to the incoming information (S50), generating setup information required for the service link of the outgoing control application 110 based on the first message (S60) to transmit the setup information to the service server 700 (S65), transmitting a second message in which the setup information is converted to service link information (S70) to the outgoing terminal 100 through the service server 700 (S75), and connecting a service based on the second message through the outgoing control application 110 of the outgoing terminal 100 (S80).

The process of generating setup information (S60) may preferably generate the setup information required for service link including at least one of a web link service and a predetermined application link based on the first message through the incoming control application 210 of the incoming terminal 200.

Furthermore, the process of generating setup information (S60) may preferably generate and transmit the setup information to the service server 700 to provide a different service link according to the received outgoing information through the incoming control application 210 of the incoming terminal 200.

The process of converting an incoming number (S15) may convert a phone number including at least one of typical characters, specific characters and complex characters to an incoming number according to a preset conversion criteria through the outgoing control application 110 of the outgoing terminal 100.

The process of transmitting a second message (S75) preferably generates and transmits service link information accessing a different service according to setup information based on the setup information differently set according to the type of one or more characters contained in the outgoing phone number through the service server 700.

Furthermore, the process of transmitting a second message (S75) may generated and transmit the second message to the outgoing terminal 100 based on preset web connection information to correspond to the incoming terminal 200 when the power of the incoming terminal 200 is turned off and the transmission of the first message is failed.

The process of connecting a service (S80) may connect a service to any one of a shop connection, a bulletin board connection, a blog connection, and an absence notification service connection based on the second message through the outgoing control application 110 of the outgoing terminal 100.

On the other hand, the process of attempting a call connection (S20) may further include connecting a call of the outgoing terminal 100 with no rejection based on the incoming number to provide an ARS service through the ARS server 600.

As described above, preferred embodiments according to the present disclosure have been illustrated and described. However, the present disclosure may not be necessarily limited to the foregoing embodiments, and it will be understood by those skilled in the art that various modifications can be made without departing from the gist of the invention as defined in the following claims.

What is claimed is:

1. A method of providing a data communication service, the method comprising:
   determining whether or not an incoming number contained in a call connection request corresponds to a preset number when the call connection request is received from a first terminal;
   rejecting a call connection of the first terminal when the incoming number corresponds to the preset number;
   communicating with a second terminal using the incoming number to generate service link information;
   transmitting a message containing the service link information to the first terminal to connect the first terminal to the data communication service, and
   wherein if at least one character, together with a plurality of numbers, is detected within a phone number entered from the first terminal, the incoming number is a number converted from the phone number;
   wherein the phone number includes the at least one character and the plurality of numbers, and indicates at least one web page provided by the data communication service;
   wherein said communication step comprises detecting incoming information and outgoing information using the incoming number, and generating a first message containing the outgoing information; transmitting the first message to the second terminal corresponding to the incoming information; and receiving setup information from the second terminal;
   wherein a second message containing the service link information is generated and transmitted to the first terminal using the setup information; and
   wherein when the power of the second terminal is turned off and thus the transmission of the first message is failed, the second message is generated and transmitted to the first terminal based on preset web connections information to correspond to the second terminal.

2. The method of claim 1, wherein control applications are provided in the first and the second terminal, respectively, and the first and the second message are formed to execute the control applications.

3. The method of claim 1, wherein the service link information is generated by setup information transmitted from the second terminal, and the setup information is differently set according to the type of character contained in the phone number, and the service link information is information accessing a different service according to the setup information.

4. The method of claim 1, wherein an ARS server receives the incoming number from the first terminal, and rejects a call connection of the first terminal, and a service server communicates with the second terminal using incoming information based on the incoming number.

5. The method of claim 4, wherein the ARS server transmits outgoing information to the service server along with the incoming information using the incoming number, and
   the service server transmits a first message containing the outgoing information to the second terminal, and receives setup information required for the service link from the second terminal.

\* \* \* \* \*